(12) United States Patent
Zhao et al.

(10) Patent No.: US 10,734,905 B2
(45) Date of Patent: Aug. 4, 2020

(54) DIRECT CURRENT-DIRECT CURRENT CONVERTER

(71) Applicant: Silergy Semiconductor Technology (Hangzhou) LTD, Hangzhou, ZheJiang Province (CN)

(72) Inventors: Chen Zhao, Hangzhou (CN); Wang Zhang, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days.

(21) Appl. No.: 16/196,679

(22) Filed: Nov. 20, 2018

(65) Prior Publication Data
US 2019/0199221 A1   Jun. 27, 2019

(30) Foreign Application Priority Data
Dec. 26, 2017  (CN) .......................... 2017 1 1437559

(51) Int. Cl.
| H02M 3/335 | (2006.01) |
| H02M 3/07 | (2006.01) |
| H02M 3/156 | (2006.01) |
| H02M 3/158 | (2006.01) |
| H02M 1/00 | (2006.01) |

(52) U.S. Cl.
CPC ......... *H02M 3/33507* (2013.01); *H02M 3/07* (2013.01); *H02M 3/156* (2013.01); *H02M 3/158* (2013.01); *H02M 3/1588* (2013.01); *H02M 3/335* (2013.01); *H02M 2001/0003* (2013.01); *H02M 2001/007* (2013.01); *H02M 2001/0058* (2013.01)

(58) Field of Classification Search
CPC . H02M 2007/4818; H02M 2007/4815; H02M 2007/4811; H02M 3/33538; H02M 3/3546; H02M 3/33515; H02M 3/33576; H02M 3/33553; H02M 3/33507; H02M 3/33592; H02M 3/33523; H02M 3/3353; H02M 3/33569
See application file for complete search history.

(56) References Cited

U.S. PATENT DOCUMENTS

| 8,687,382 B2 | 4/2014 | Chen |
| 8,729,819 B2 | 5/2014 | Zhou et al. |
| 8,917,528 B2 | 12/2014 | Xu |

(Continued)

FOREIGN PATENT DOCUMENTS

TW   201543798 A   11/2015

*Primary Examiner* — Bryan R Perez
(74) *Attorney, Agent, or Firm* — Michael C. Stephens, Jr.

(57) ABSTRACT

A DC-DC converter can include: a switched capacitor converter including at least one switch group and at least one capacitor, where each of the at least one switch group includes two switches are coupled in series, and at least one of the capacitors is coupled in parallel with a corresponding one of the switch groups; and at least one switch converter, where each switch converter includes at least one primary magnetic circuit and is configured to share at least one of the switch groups, one terminal of the primary magnetic circuit is coupled to an intermediate node of the shared switch group, the intermediate node is a common coupling point of two switches of the shared switch group, and the switch converter is an unidirectional power converter.

20 Claims, 11 Drawing Sheets

(56) References Cited

U.S. PATENT DOCUMENTS

| | | |
|---|---|---|
| 9,287,782 B2 | 3/2016 | Chen |
| 9,473,034 B2 | 10/2016 | Huang et al. |
| 9,762,128 B2 | 9/2017 | Zhang et al. |
| 2009/0316443 A1* | 12/2009 | Coccia .................... H02M 1/10 |
| | | 363/21.06 |
| 2012/0229034 A1* | 9/2012 | Yu ........................ H02M 3/3376 |
| | | 315/186 |
| 2012/0300519 A1 | 11/2012 | Clemmons et al. |
| 2013/0181620 A1 | 7/2013 | Zhao |
| 2013/0201730 A1 | 8/2013 | Luo |
| 2013/0265016 A1 | 10/2013 | Chang et al. |
| 2013/0294114 A1* | 11/2013 | Nakanishi ......... H02M 3/33569 |
| | | 363/21.01 |
| 2017/0353116 A1* | 12/2017 | Zhang ..................... H02M 1/08 |
| 2018/0198367 A1 | 7/2018 | Zhang et al. |

* cited by examiner

DIRECT CURRENT-DIRECT CURRENT CONVERTER

RELATED APPLICATIONS

This application claims the benefit of Chinese Patent Application No. 201711437559.0, filed on Dec. 26, 2017, which is incorporated herein by reference in its entirety.

FIELD OF THE INVENTION

The present invention generally relates to the field of power electronics, and more particularly to direct current-direct current (DC-DC) converters.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

Figure 1:
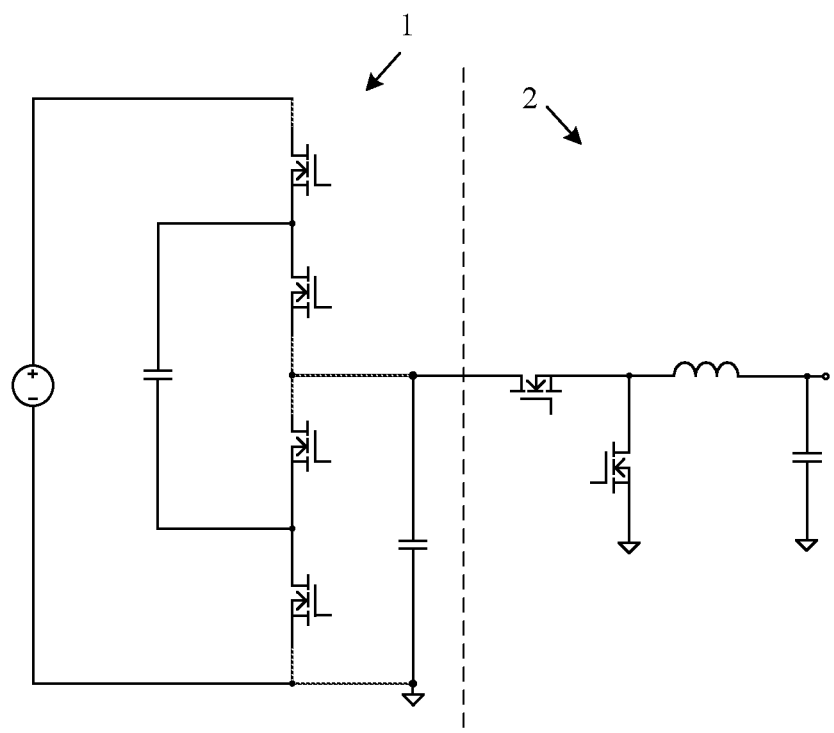
FIG. 1 is a schematic block diagram of an example DC-DC converter.

Referring now to FIG. 1, shown is a schematic block diagram of an example DC-DC. A switched capacitor converter may perform voltage conversion or current conversion by controlling the charge/discharge of capacitors through switches. However, a switched capacitor converter may only achieve voltage conversion with a constant transformation ratio. In addition, since there can be a relatively high and unexpected pulsation that may be generated in the current of an input power supply and other devices, a generated output voltage may also have such pulsation. In one approach, in order to achieve a voltage conversion with a changeable transformation ratio between an input voltage and an output voltage and to smooth the output voltage, a switch converter can be provided at a former stage or a later stage of the switched capacitor converter, which may be coupled in series to the switched capacitor converter. As shown in the example of FIG. 1, switched capacitor converter 1 can be used as an input stage, and switch converter 2 with a buck topology may be used as an output stage. One drawback of this approach, however, is a relatively large circuit scale/size.

In one embodiment, a direct current-direct current (DC-DC) converter can include: (i) a switched capacitor converter including at least one switch group and at least one capacitor, where each of the at least one switch group includes two switches are coupled in series, and at least one of the capacitors is coupled in parallel with a corresponding one of the switch groups; and (ii) at least one switch converter, where each switch converter includes at least one primary magnetic circuit and is configured to share at least one of the switch groups, one terminal of the primary magnetic circuit is coupled to an intermediate node of the shared switch group, the intermediate node is a common coupling point of two switches of the shared switch group, and the switch converter is an unidirectional power converter.

Figure 2:
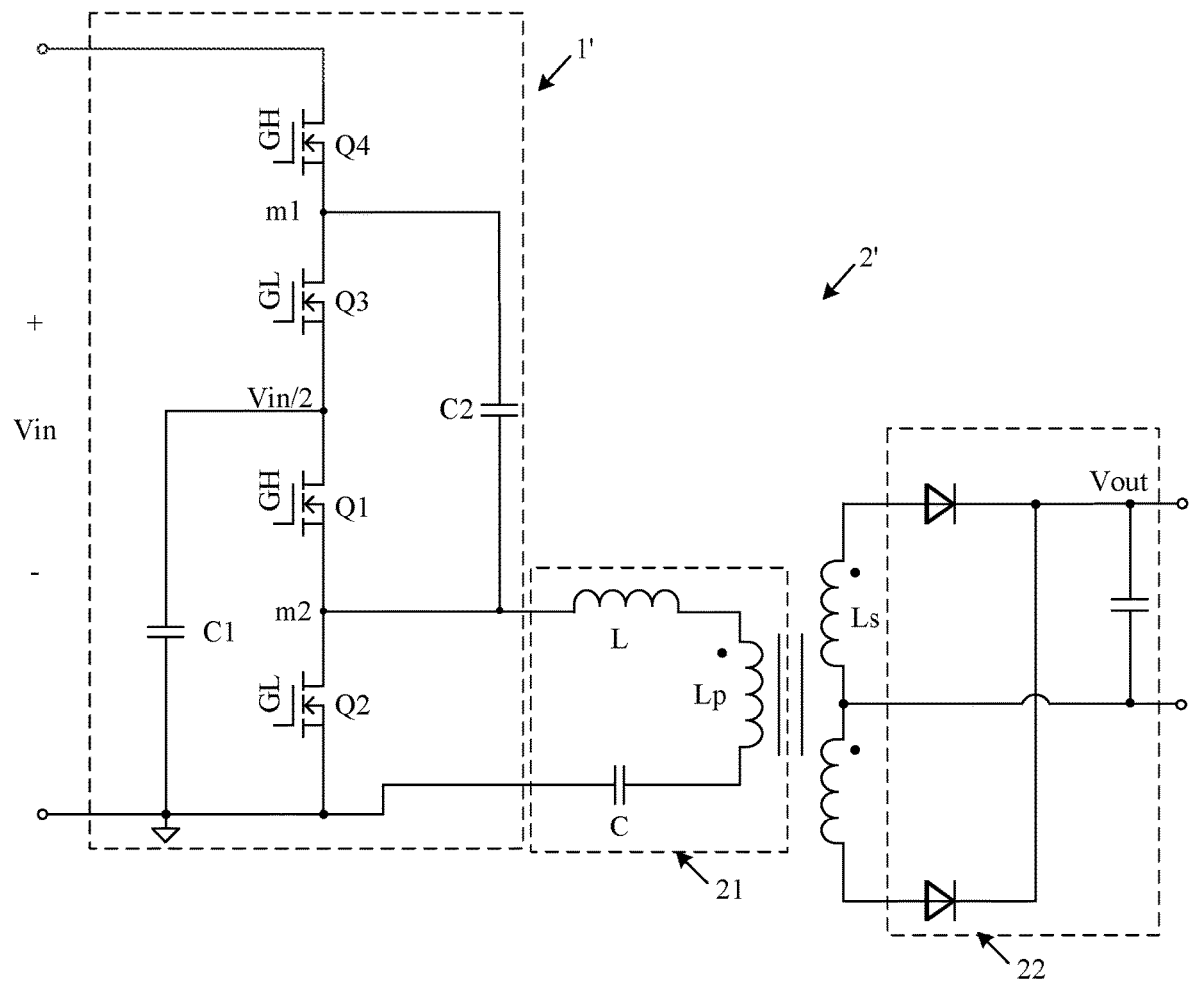
FIG. 2 is a schematic block diagram of a first example DC-DC converter, in accordance with embodiments of the present invention.

Referring now to FIG. 2, shown is a schematic block diagram of a first example DC-DC converter, in accordance with embodiments of the present invention. In this particular example, the DC-DC converter can include non-isolated switched capacitor converter 1' and switch converter 2'. Switch converter 2' may share a switch group in switched capacitor converter 1'. Switched capacitor converter 1' can include two switch groups: a switch group including switches Q1 and Q2 coupled in series, and a switch group including switches Q3 and Q4 coupled in series. The two switch groups may be sequentially coupled in series between two terminals of an input port. A common coupling point of two switches in each of the switch groups is defined as an intermediate node mi of the switch group, where i=1, 2.

In particular embodiments, switches Q1 to Q4 can be metal-oxide-semiconductor field effect transistors (MOSFETs). Alternately or additionally, other electronically controlled switch devices, such as bipolar junction transistor (BJTs) and insulated gate bipolar translator (IGBTs) may also be used as the switches. Switched capacitor converter 1' can include capacitors C1 and C2. Capacitor C1 can connect in parallel with the switch group including switches Q1 and Q2. One terminal of capacitor C2 can connect to intermediate node m1, and the other terminal of capacitor C2 can connect to intermediate node m2.

In this example, the switch converter is a unidirectional power converter. Switch converter 2' can include primary magnetic circuit 21. One terminal of primary magnetic circuit 21 can connect to intermediate node m2 of the switch group including switches Q1 and Q2, and the other terminal of primary magnetic circuit 21 can connect to one terminal of the switch group including switches Q1 and Q2 (e.g., a grounded terminal of an input port). The operating state of primary magnetic circuit 21 can change under control of the shared switch group to generate a varying current, thereby transmitting power to a secondary circuit. Switch converter 2' may also include secondary winding Ls coupled to primary winding Lp and rectifier circuit 22. Secondary winding Ls may be coupled to primary magnetic circuit 21 to generate a varying current. Rectifier circuit 22 can rectify the varying current to generate a direct current voltage.

For example, the primary magnetic circuit can include resonant inductor L, primary winding Lp, and resonance capacitor C coupled in series. That is, the primary magnetic circuit can include the primary winding and an LC series resonant circuit. In this case, switches Q1 and Q2 and primary magnetic circuit 21 may together form a primary circuit of an LLC resonant half-bridge converter. Switch converter 2' may share the switch group (e.g., including the switches Q1 and Q2) with switched capacitor converter 1'. The primary magnetic circuit may alternately or additionally include other circuit forms, such as an LCC resonant circuit.

In switched capacitor converter 1', switches Q1 and Q4 can be controlled in response to switch control signal GH, and switches Q2 and Q3 can be controlled in response to switch control signal GL. For example, switch control signal GH and switch control signal GL may be mutually complementary. That is, when signal GH is high, signal GL is low, and vice versa. For example, switches Q1 to Q4 are N-type MOSFETs. Therefore, when switch control signal GH is high and switch control signal GL is low, switches Q1 and Q4 are on, and switches Q2 and Q3 are off. In this case, a loop starting from an input port and sequentially passing through switch Q4, capacitor C2, switch Q1, and capacitor C1 may be formed, and capacitors C1 and C2 can be charged with an input voltage. When switch control signal GL is high and switch control signal GH is low, switches Q1 and Q4 are off, and switches Q2 and Q3 are on. In this case, a loop including switch Q2, capacitor C2, switch Q3, and capacitor C1 may be formed, electric energy stored in capacitors C1 and C2 can be used to supply power, and a voltage of each of the capacitors may be a half of input voltage Vin at the input port. In this way, the capacitors can be repeatedly discharged/charged by continuously switching states of the switch groups, thereby achieving a substantially constant output.

It can be seen from the above description that a ratio between an output voltage and an input voltage of switched capacitor converter 1' is fixed and independent from the duty cycle of switch control signals GH or GL. Output voltage Vout of switch converter 2' can be determined based on a half of input voltage Vin at the input port (Vin/2) and the duty cycles of the switch control signals of two switches Q1 and Q2. Therefore, a control circuit may be configured to adjust the duty cycles of switch control signals GH and GL based on a desired output voltage, and to maintain switch control signals GH and GL as complementary. Switched capacitor converter 1' may operate normally as long as switch control signals GH and GL are mutually complementary. Switches Q1 and Q2 may be alternately be turned on/off by controlling the duty cycles of the switch control signals, in order to achieve power conversion at a second stage. With converter 2', voltage pulsation in the output of switched capacitor converter 1' may be substantially eliminated and a ratio between the output voltage and the input voltage may also be adjusted, thereby adjusting the gain of the full DC-DC converter. For example, the gain of switched capacitor converter 1' is ½, and the gain of switch converter 2' is less than 1.

In switched capacitor converter 1', switches Q1 and Q2 of the shared switch group can be used to switch the states of the circuit, in order to charge and discharge capacitors C1 and C2. In switch converter 2', switches Q1 and Q2 of the shared switch group can be used as a main power switch and a synchronous rectification switch in order to control a duration that inductor L stores energy and a duration that inductor L releases energy. As described above, since the gain of switched capacitor converter 1' is independent from the duty cycles of the switch control signals of switches Q1 and Q2, only switch converter 2' may be affected when the duty cycles of the switch control signals are changed. The control circuit may adjust the duty cycles of the switch control signals in various control manners, in order to adjust the state of switch converter 2'. Such control manners may include a pulse-width modulation (PWM) manner, a pulse frequency modulation (PFM) manner, and a combination of the PWM manner and the PFM manner.

Figure 3:
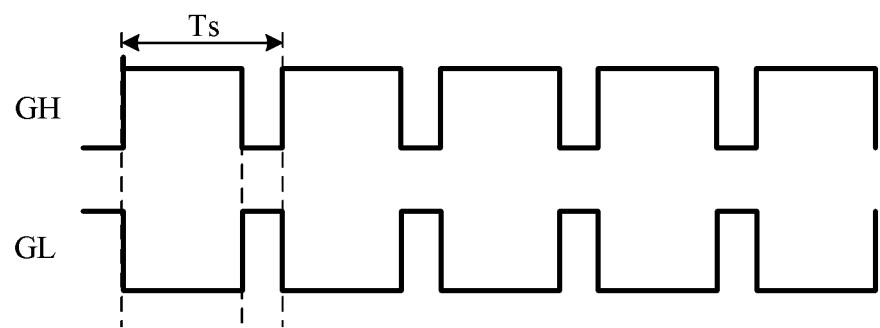
FIG. 3 is a waveform diagram of example operation of the switch control signals for the first example DC-DC converter for PWM control, in accordance with embodiments of the present invention.

Referring now to FIG. 3, shown is a waveform diagram of example operation of the switch control signals for the first example DC-DC converter for PWM control, in accordance with embodiments of the present invention. As shown, in each switch period Ts, switch control signals GH and GL are mutually complementary. When switch period Ts is constant, the output voltage of the direct current-direct current converter may be adjusted by changing the duty cycle (e.g., the switches are N-type MOSFETs, and the duty cycle may be changed by changing duration of a high level in each switch period).

Figure 4:
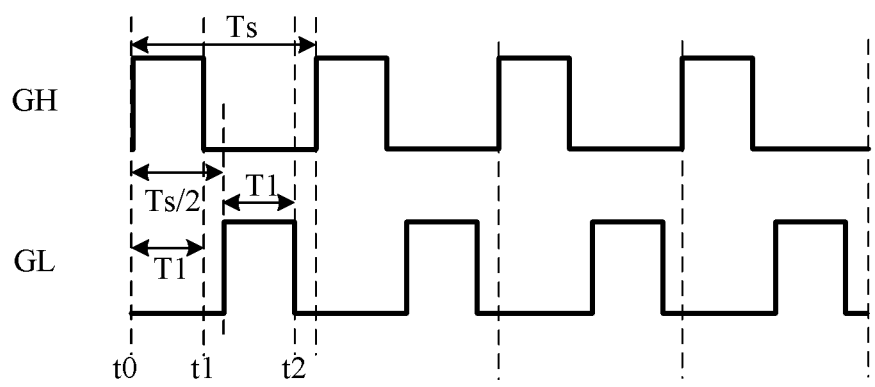
FIG. 4 is a waveform diagram of example operation of the switch control signals for the first example DC-DC converter for another PWM control, in accordance with embodiments of the present invention.

Referring now to FIG. 4, shown is a waveform diagram of example operation of the switch control signals for the first example DC-DC converter for another PWM control, in accordance with embodiments of the present invention. In this particular example, switch control signals GH and GL are mutually symmetrical. This indicates that switch control signals GH and GL have the same waveform and duty cycle, and different phases. For example, as in switch period Ts, signal GH may remain high for duration T1 (e.g., from time t0 to time t1), and signal GL may remain high the duration T1 (e.g., from time Ts/2 to time t2). That is, signal GL may lag signal GH by Ts/2. However, signals GL and GH may have the same duty cycle. The symmetrical signals can have a dead time period during which the switches of the switch groups transition. During the dead time period, the two switches of the switch group may be off to prevent the two switches from being both switched on during the transition. For switch converter 2', power conversion can still be achieved by alternately turning on/off switches Q1 and Q2 in response to the switch control signals as shown. By adjusting the duty cycles of the switch control signals, the gain can be adjusted and a substantially constant output voltage may be achieved.

Figure 5:
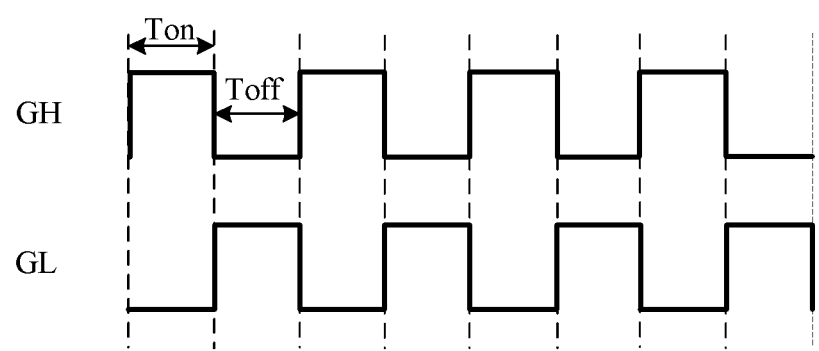
FIG. 5 is a waveform diagram of example operation of the switch control signals for the first example DC-DC converter for PFM control, in accordance with embodiments of the present invention.

Referring now to FIG. 5, shown is a waveform diagram of example operation of the switch control signals for the first example DC-DC converter for PFM control, in accordance with embodiments of the present invention. As shown in this example, for switch control signals GH and GL, switch periods may not necessarily be constant, and a switched-on duration Ton or a switched-off duration Toff may be constant. The output voltage of the switched capacitor converter 2' may also be adjusted by adjusting the switch periods, and/or by changing the switch frequency.

Figure 6:
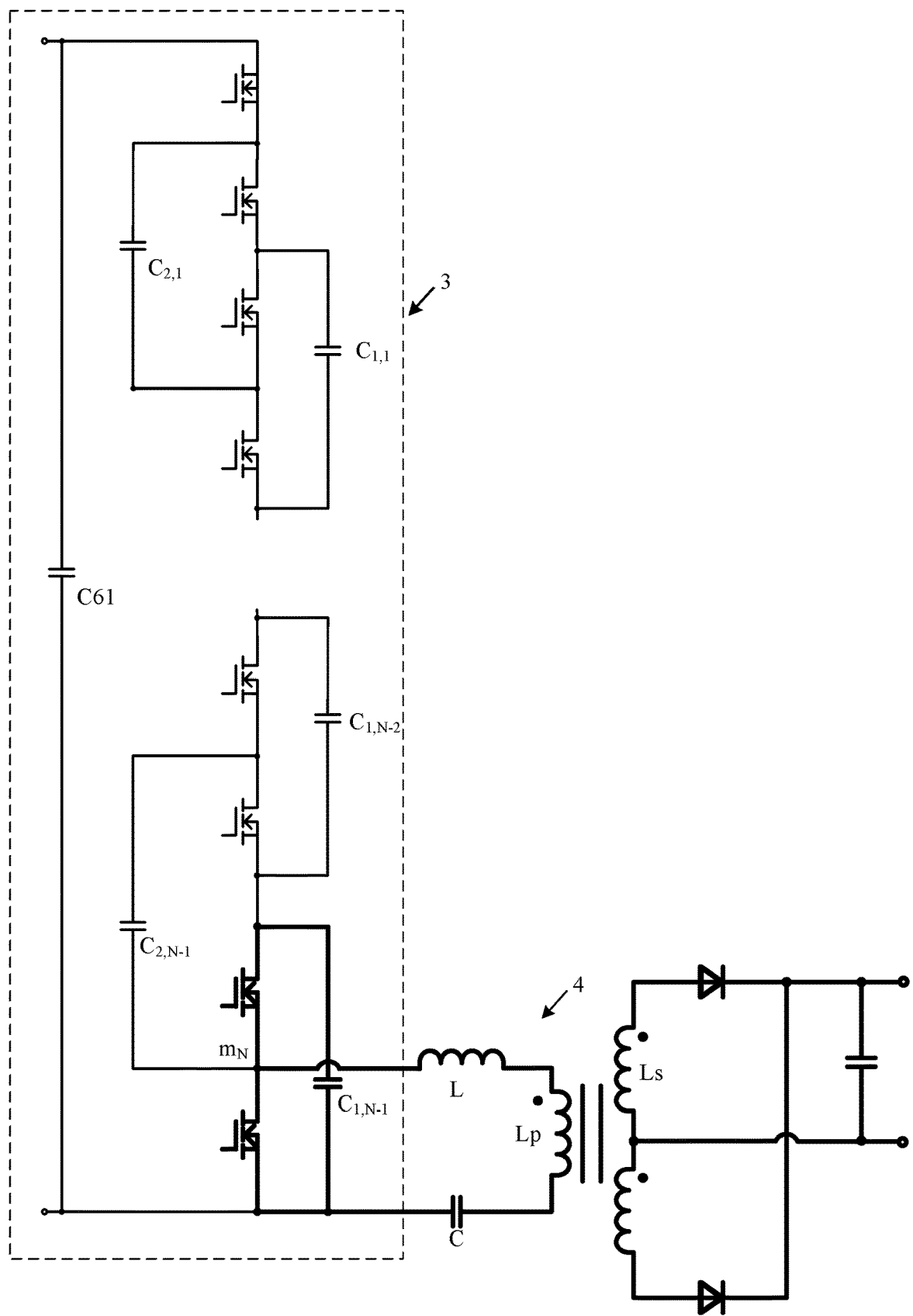
FIG. 6 is a schematic block diagram of a variation of the first example DC-DC converter, in accordance with embodiments of the present invention.

Referring now to FIG. 6, shown is a schematic block diagram of a variation of the first example DC-DC converter, in accordance with embodiments of the present invention. In particular embodiments, the number of the switch groups of the switched capacitor converter may not be limited to two, but rather can be more than two based on a desired transformation ratio. In this particular example, switched capacitor converter 3 can include N switch groups. Each of the switch groups can include two switches coupled in series. The N switch groups can be sequentially coupled in series between two terminals of an input port. Switched capacitor converter 3 may also include capacitors $C_{1,1}$ to $C_{1,N-1}$ and $C_{2,1}$ to $C_{2,N-1}$. Capacitors $C_{1,1}$ to $C_{1,N-1}$ can be respectively coupled with second to N-th switch groups in parallel. Each of capacitors $C_{2,1}$ to $C_{2,N-1}$ can connect between intermediate nodes of two adjacent switch groups. That is, capacitor $C_{2,i}$ can connect between intermediate node mi of an i-th switch group and intermediate node $m_{i+1}$ of an (i+1)-th switch group, where i=1, 2, . . . N. As shown, an N-th switch group may be shared by switch converter 4. A primary magnetic circuit can be coupled between intermediate node $m_N$ of the N-th switch group (e.g., a switch group closest to the grounded terminal) and a grounded terminal of the input port. Optionally, any one of the N switch groups may be shared by switch converter 4 to perform power conversion.

In particular embodiments, the switched capacitor converter may be cascaded with the switch converter. Because the switched capacitor converter includes multiple switch groups, the switch converter may share at least one of the switch groups of the switched capacitor converter. This arrangement can effectively reduce the number of circuit components and also increase circuit component utilization. In addition, the sharing of the switch group may bring no negative effect on the operation of the switched capacitor converter, and the DC-DC converter can achieve an adjustable smoothing output voltage, as well as an adjustable gain.

Figure 7:
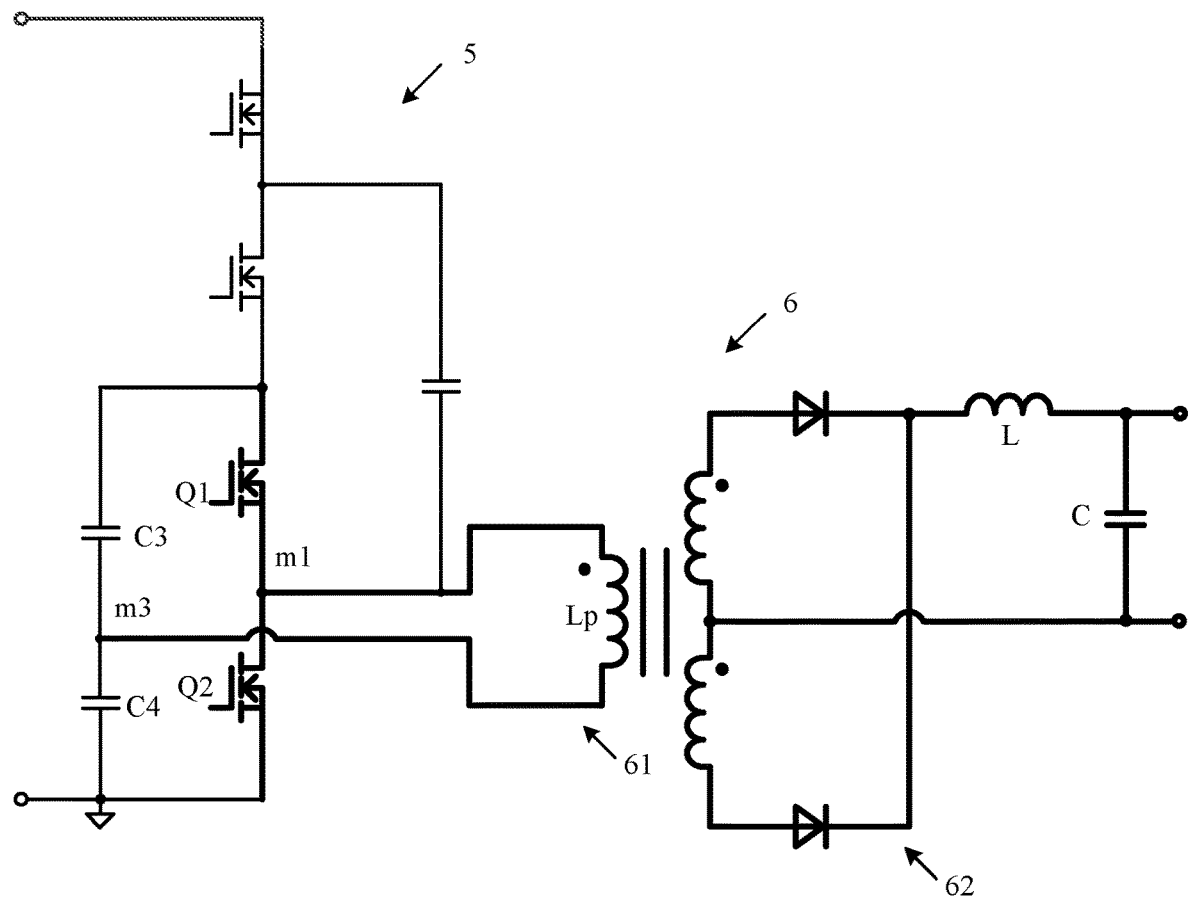
FIG. 7 is a schematic block diagram of a second example DC-DC converter, in accordance with embodiments of the present invention.

Referring now to FIG. 7, shown is a schematic block diagram of a second example DC-DC converter, in accordance with embodiments of the present invention. In particular embodiments, the isolated switched capacitor converter may also be configured in other forms and/or topologies. In this example, switched capacitor converter 5 and switch converter 6 may share a switch group that includes switches Q1 and Q2. Switched capacitor converter 5 can include series capacitors C3 and C4 that are coupled in series between two terminals of the switch group that includes switches Q1 and Q2 and has a common coupling point m3. Primary magnetic circuit 61 of switch converter 6 can include primary winding Lp, where two terminals of which are respectively coupled to intermediate node m1 and common coupling point m3.

Secondary circuit 62 of switch converter 6 can include a secondary rectifier circuit and a filter circuit. For example, capacitors C3 and C4 can be coupled in series and one terminal of primary magnetic circuit 61 may be coupled to the common coupling point of capacitors C3 and C4. Thus, an alternating current can be generated with a voltage at two terminals of the primary winding as switches Q1 and Q2 are alternately turned on/off, thereby achieving transformer transmission via a transformer formed by the primary and secondary windings. In this example, the shared switch group can be coupled to the primary magnetic circuit in a half-bridge manner, thereby outputting the alternating current. Alternatively, the switches of the switch converter can be configured to form a full-bridge switch circuit.

Figure 8:
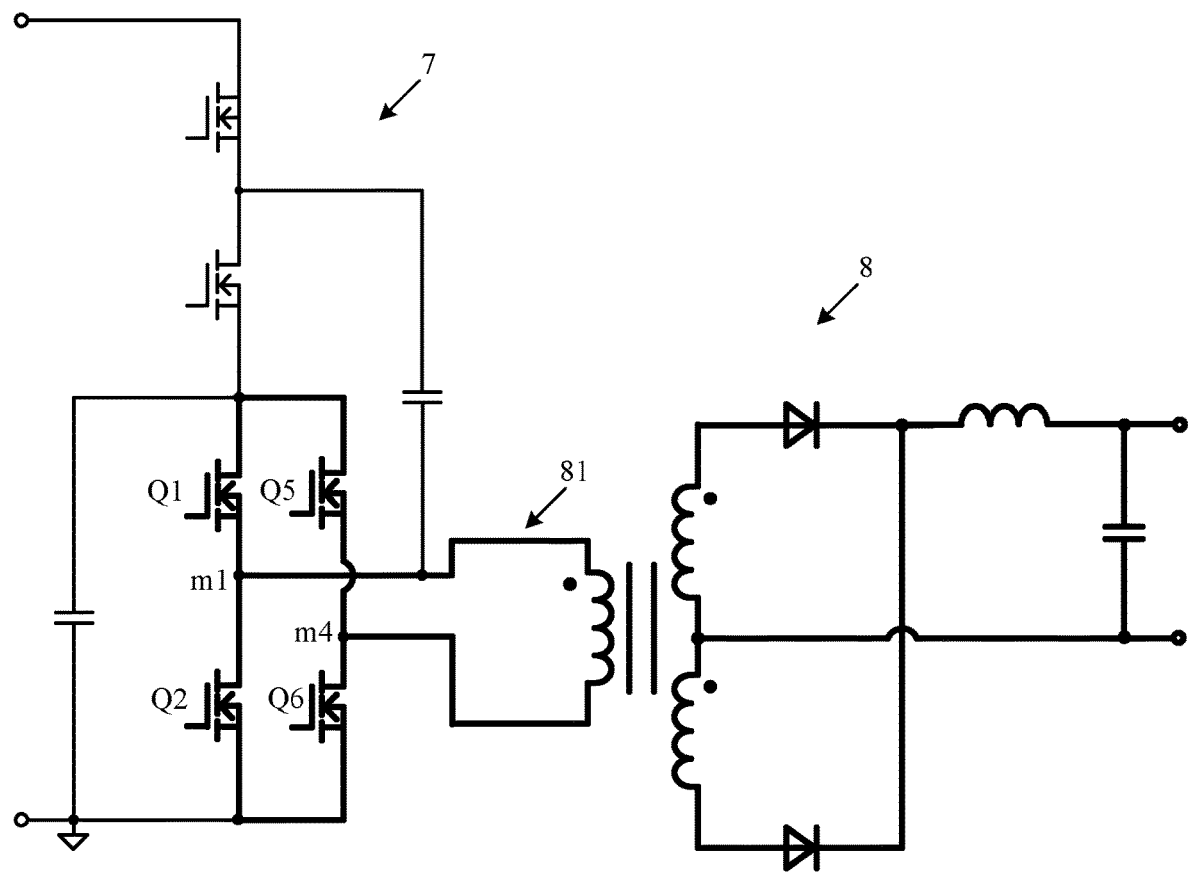
FIG. 8 is a schematic block diagram of a third example DC-DC converter, in accordance with embodiments of the present invention.

Referring now to FIG. 8, shown is a schematic block diagram of a third example DC-DC converter, in accordance with embodiments of the present invention. In this particular example, in addition to the primary magnetic circuit and the secondary circuit, switch converter 8 can also include a primary switch group that includes switches Q5 and Q6 coupled in series. The primary switch group can be coupled with the shared switch group (e.g., including switches Q1 and Q2) in parallel. Two terminals of primary magnetic circuit 81 can be respectively coupled to intermediate node m1 of the shared switch group and intermediate node m4 of the primary switch group. That is, the shared switch group of switched capacitor converter 7 and the primary switch group can be coupled to primary magnetic circuit 81 in a full-bridge manner. An output voltage of switched capacitor converter 7 may be converted to an alternating current by controlling the above switch groups to be alternately turned on/off, and then the alternating current may be transmitted to the secondary circuit via the transformer. In particular embodiments, the switch converter can perform the unidirectional power transmission from an input terminal to an output terminal, and a change at the output terminal may not result in a mutation at the input terminal. In this case, multiple switch converters may be provided, in order to respectively share multiple different switch groups.

Figure 9:
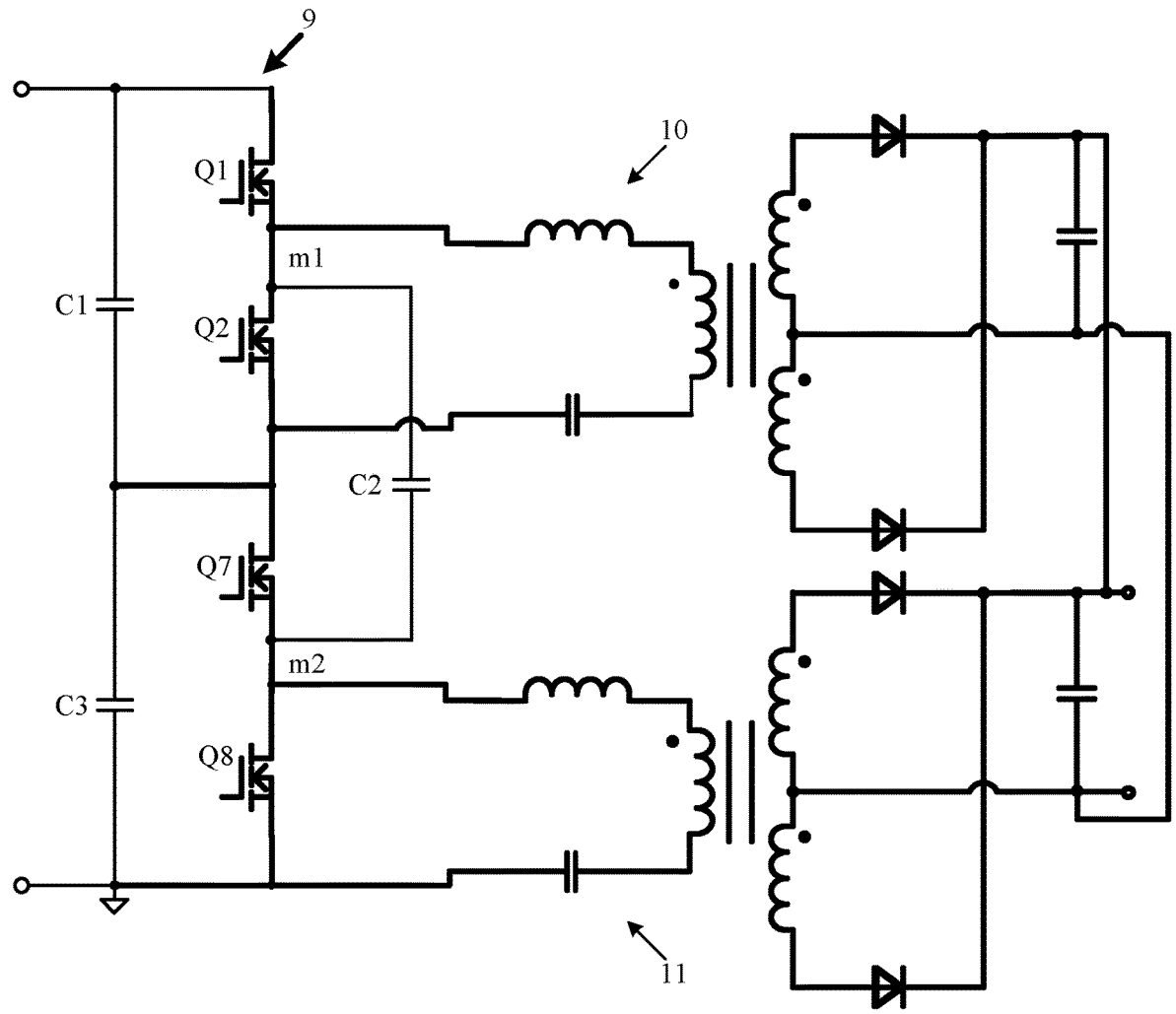
FIG. 9 is a schematic block diagram of a fourth example DC-DC converter, in accordance with embodiments of the present invention.

Referring now to FIG. 9, shown is a schematic block diagram of a fourth example DC-DC converter, in accordance with embodiments of the present invention. In this particular example, switched capacitor converter 9 can include a switch group including switches Q1 and Q2, a switch group including switches Q7 and Q8, and capacitors C1, C2 and C3. Capacitor C1 can be coupled with the switch group including switches Q1 and Q2 in parallel. Capacitor C3 can be coupled with the switch group including switches Q7 and Q8 in parallel. Capacitor C2 can be coupled between intermediate nodes m1 and m2. Switch converter 10 may share the switch group including switches Q1 and Q2. Switch converter 11 may share the switch group including switches Q7 and Q8. Output terminals of switch converters 10 and 11 can be coupled in parallel. Alternatively, switch converters 10 and 11 may be separately coupled to two output ports. In the above examples, the switched capacitor converter is a non-isolated switched capacitor converter; however, the switched capacitor converter may alternatively be an isolated switched capacitor converter.

Figure 10:
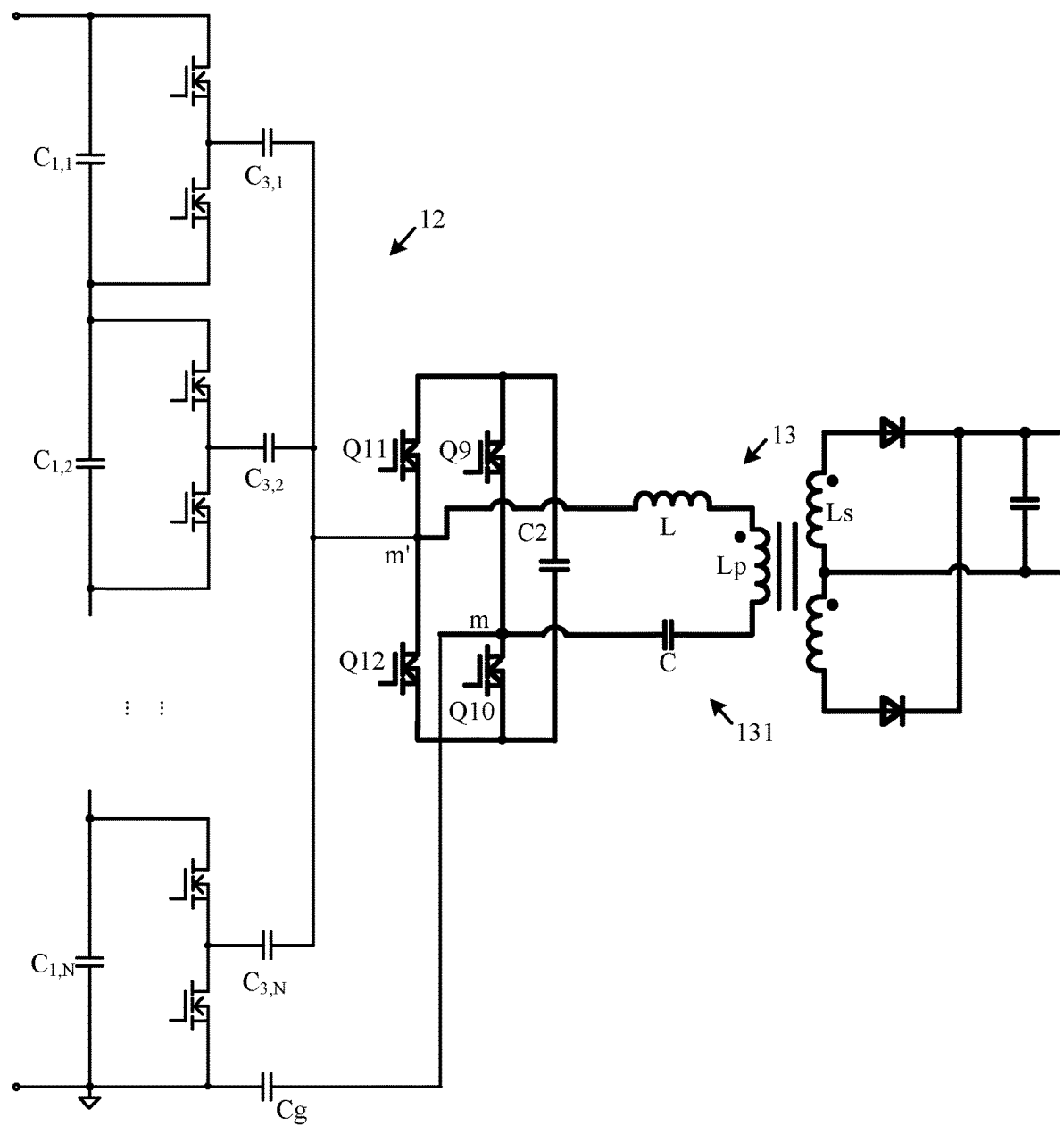
FIG. 10 is a schematic block diagram of a fifth example DC-DC converter, in accordance with embodiments of the present invention.

Referring now to FIG. 10, shown is a schematic block diagram of a fifth example DC-DC converter, in accordance with embodiments of the present invention. In this particular example, the DC-DC converter can include isolated switched capacitor converter 12 and switch converter 13. Switched capacitor converter 12 can include N first switch groups, one second switch group (e.g., including switches Q9 and Q10), and one third switch group (e.g., including switches Q11 and Q12), where N is greater than or equal to two. Each of the switch groups can include two switches coupled in series. The N first switch groups may be sequentially coupled in series between two terminals of an input port. The second switch group can be coupled between two terminals of an output port of switched capacitor converter 12. The switched capacitor converter may also include capacitors $C_{1,1}$ to $C_{1,N}$, capacitor C2, and capacitors $C_{3,1}$ to $C_{3,N}$.

Capacitor $C_{1,i}$ can be coupled in parallel with an i-th first switch group, where i=1, 2, . . . , N. Capacitor C2 can be coupled in parallel with the second switch group. Capacitor $C_{3,i}$ can be coupled between intermediate node mi of the i-th first switch group and intermediate node m' of the third switch group. With capacitors $C_{3,1}$ to $C_{3,N}$, switched capacitor converter 12 may effectively isolate the input port from the output port, thereby effectively restraining common-mode noise at the input port. In this example, switch converter 13 may share the second and third switch groups. The second switch group can include switches Q9 and Q10, while the third switch group can include switches Q11 and Q12. Two terminals of primary magnetic circuit 131 may be respectively coupled to intermediate node m of the second switch group and intermediate node m' of the third switch group.

For example, isolated capacitor Cg can be coupled between a grounded terminal of the input port and intermediate node m of the second switch group. Alternatively, isolated capacitor Cg may be coupled between intermediate node m of the second switch group and any one of coupling terminals of capacitors $C_{1,1}$ to $C_{1,N}$. For example, the two switch groups can be shared in order to form a full-bridge LLC resonant converter. One switch group may be shared to form a half-bridge LLC resonant converter. In addition, an isolated switched capacitor converter with only one switch group at an output side may be utilized, and the switch group can be shared to form the half-bridge LLC resonant converter.

Figure 11:
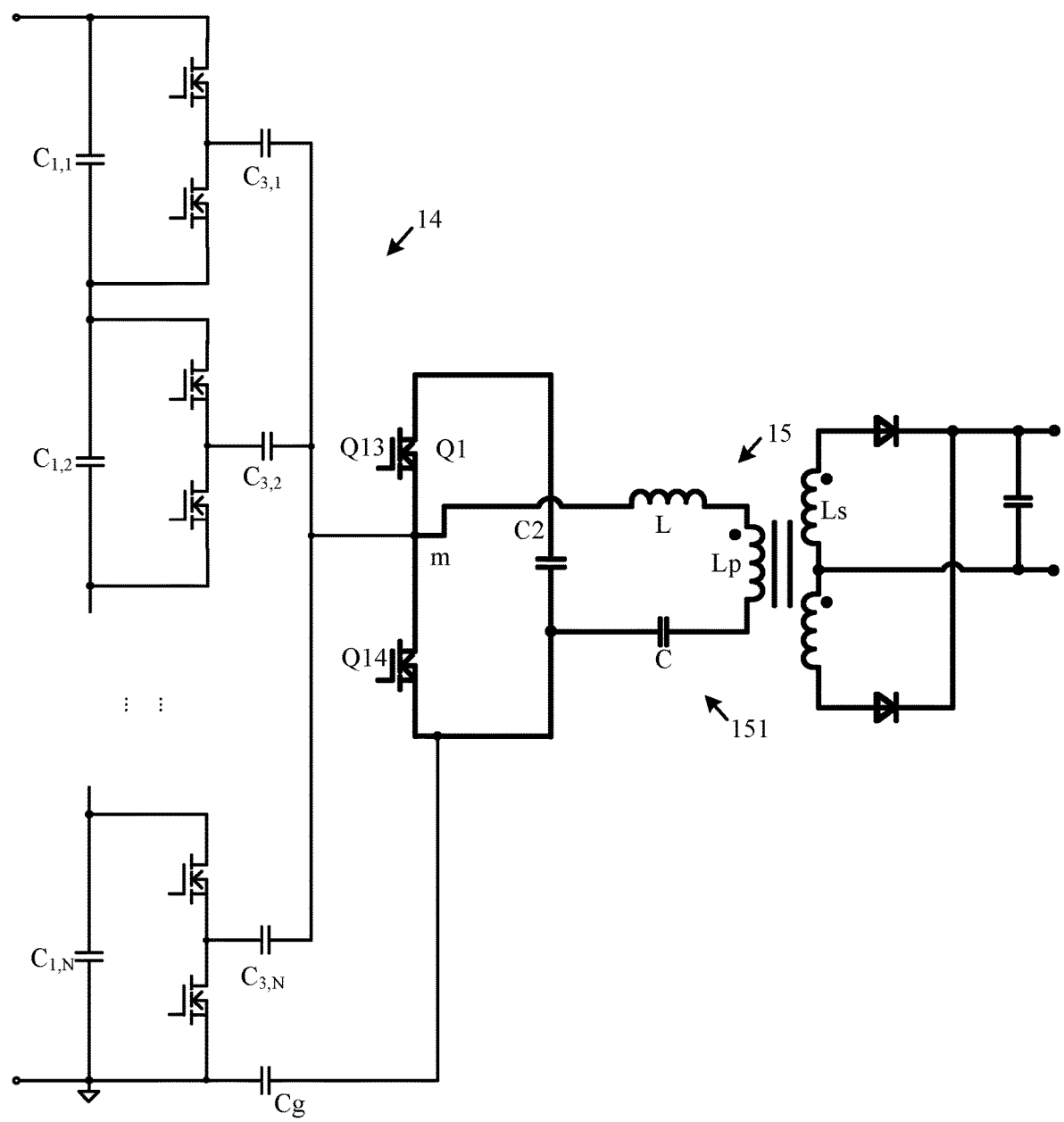
FIG. 11 is a schematic block diagram of a sixth example DC-DC converter, in accordance with embodiments of the present invention.

Referring now to FIG. 11, shown is a schematic block diagram of a sixth example DC-DC converter, in accordance with embodiments of the present invention. In this particular example, the DC-DC converter can include isolated switched capacitor converter 14 and switch converter 15. Switched capacitor converter 14 can include N first switch groups and one second switch group (e.g., including switches Q13 and Q14), where N is greater than or equal to two. Each of the switch groups can include two switches coupled in series. The N first switch groups can be sequentially coupled in series between two terminals of an input port. The second switch group may be coupled between two terminals of an output port of switched capacitor converter 14. Switched capacitor converter 14 may further include capacitors $C_{1,1}$ to $C_{1,N}$, capacitor C2, and capacitors $C_{3,1}$ to $C_{3,N}$. Capacitor $C_{1,i}$ can be coupled in parallel with an i-th first switch group, where i=1, 2, . . . , N. Capacitor C2 can be coupled in parallel with the second switch group. Capacitor $C_{3,i}$ can be coupled between intermediate node mi of an i-th first switch group and intermediate node m of the second switch group. For example, switched capacitor converter 15 may share the second switch group. Two terminals of primary magnetic circuit 151 can be respectively coupled to intermediate node m of the second switch group and one terminal of the second switch group.

For example, isolated capacitor Cg can be coupled between a grounded terminal of the input port and one terminal of the second switch group. Alternatively, isolated capacitor Cg may be coupled between one terminal of the second switch group and any one of coupling terminals of capacitors $C_{1,1}$ to $C_{1,N}$. In particular embodiments, a switched capacitor converter and a switch converter may be cascaded to perform power conversion. Because the switches in each of the switch groups of the switched capacitor converter are alternately switched on/off, at least one switch group may be shared as at least one bridge arm of a switch converter, thereby effectively reducing the number of the switches and improving device utilization.

In particular embodiments, a cascaded structure may also have advantages of the switched capacitor converter and the switch converter, such that the gain of the DC-DC converter can be changed, and the output voltage can effectively be smoothed. The switched capacitor converter may be an isolated switched capacitor converter or a non-isolated switched capacitor converter. The switch converter may be a half-bridge converter, a full-bridge converter, an LLC resonant converter, an LC resonant converter, or any other suitable topology that can achieve unidirectional power transmission.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A direct current-direct current (DC-DC) converter, comprising:
   a) a switched capacitor converter comprising a plurality of switch groups coupled between two terminals of a first port, and a plurality of capacitors, wherein each switch group comprises first and second switches that are coupled in series, and at least one of the capacitors is coupled to be parallel with a corresponding one of the switch groups, wherein the switch group that is directly connected to a first terminal of the first port is not coupled in parallel with a capacitor; and
   b) at least one switch converter, wherein each switch converter comprises at least one primary magnetic circuit and is configured to share at least one of the switch groups, wherein a primary magnetic circuit is connected to be parallel with the second switch of the shared switch group, and the shared switch group is coupled in parallel with a capacitor, wherein the switch converter is a unidirectional power converter, wherein the first switches in each switch group are controlled by a first control signal, the second switches in each switch group are controlled by a second control signal, and the first and second control signals are not overlapped and have the same waveform and duty cycle with different phases.

2. The DC-DC converter of claim 1, further comprising a control circuit configured to control the at least one shared switch group in a pulse width modulation (PWM) manner, a pulse frequency modulation (PFM) manner, or a combination of the PWM manner and the PFM manner, in order to adjust duty cycles of the first and second switches of the shared switch group, and to adjust an output voltage of the DC-DC converter based on a voltage conversion of the switched capacitor converter.

3. The DC-DC converter of claim 2, wherein duty cycles of the first and second switches for each switch group in other switch groups respectively correspond to the duty cycles of the first and second switches in the shared switch group.

4. The DC-DC converter of claim 1, wherein the switched capacitor converter comprises at least one of: an isolated switched capacitor converter, and a non-isolated switched capacitor converter.

5. The DC-DC converter of claim 1, wherein the switch converter is configured to share one of the switch groups.

6. The DC-DC converter of claim 5, wherein:
a) the at least one capacitor of the switched capacitor converter comprises a first capacitor coupled in parallel with the shared switch group;
b) one terminal of the primary magnetic circuit is coupled to a common node of the first and second switches of the shared switch group; and
c) another terminal of the primary magnetic circuit is coupled to one terminal of the shared switch group.

7. The DC-DC converter of claim 5, wherein:
a) the at least one capacitor of the switched capacitor converter comprises a first series capacitor and a second series capacitor;
b) the first series capacitor and the second series capacitor are coupled in series between two terminals of the shared switch group;
c) one terminal of the primary magnetic circuit is coupled to a common node of the first and second switches of the shared switch group; and
d) another terminal of the primary magnetic circuit is coupled to a common coupling point of the first series capacitor and the second series capacitor.

8. The DC-DC converter of claim 5, wherein the switch converter further comprises a primary switch group, wherein the primary switch group and the shared switch group are coupled to the primary magnetic circuit in a full-bridge manner.

9. The DC-DC converter of claim 1, wherein the number of the at least one switch converter is N, wherein the N switch converters are configured to respectively share N switch groups, and N is a positive integer that is greater than or equal to two.

10. The DC-DC converter of claim 9, wherein:
a) the at least one capacitor of the switched capacitor converter comprises N first capacitors respectively coupled in parallel with the N shared switch groups;
b) one terminal of each of the at least one primary magnetic circuit is coupled to an intermediate node of the corresponding shared switch group; and
c) another terminal of the primary magnetic circuit is coupled to one terminal of the shared switch group.

11. The DC-DC converter of claim 9, wherein:
a) the at least one capacitor of the switched capacitor converter comprises N first series capacitors and N second series capacitors;
b) an i-th first series capacitor and an i-th second series capacitor are coupled in series between two terminals of an i-th shared switch group, wherein i is a positive integer having a maximum value of N;
c) one terminal of an i-th primary magnetic circuit is coupled to an intermediate node of the i-th shared switch group; and
d) another terminal of the i-th primary magnetic circuit is coupled to a common coupling point of the i-th first series capacitor and the i-th second series capacitor.

12. The DC-DC converter of claim 9, wherein an i-th switch converter further comprises a primary switch group, wherein the primary switch group and an i-th shared switch group are coupled to an i-th primary magnetic circuit in a full-bridge manner, wherein i is a positive integer having a maximum value of N.

13. The DC-DC converter of claim 1, wherein the switch converter is configured to share two of the switch groups, wherein the two switch groups are coupled to the primary magnetic circuit in a full-bridge manner.

14. The DC-DC converter of claim 1, wherein the primary magnetic circuit comprises at least one of: a primary winding, and a resonance circuit.

15. The DC-DC converter of claim 1, wherein:
a) the at least one switch group comprises N switch groups, wherein N is a positive integer that is greater than or equal to two;
b) the at least one capacitor comprises N−1 first capacitors and N−1 second capacitors;
c) the N switch groups are sequentially coupled in series between two terminals of a first port;
d) the N−1 first capacitors are respectively coupled in parallel with a second to a N-th switch groups; and
e) an i-th second capacitor is coupled between an intermediate node of an i-th switch group and an intermediate node of an (i+1)-th switch group, wherein i is a positive integer having a maximum value of N.

16. The DC-DC converter of claim 1, wherein:
a) the at least one switch group comprises N first switch groups and one second switch group, wherein N is a positive integer that is greater than or equal to two;
b) the at least one capacitor comprises N first capacitors, one second capacitor, and N third capacitors;
c) the N first switch groups are sequentially coupled in series between two terminals of a first port;
d) the N first capacitors are respectively coupled with the N first switch groups in parallel, one terminal of an i-th third capacitor is coupled to an intermediate node of the second switch group, wherein i is a positive integer having a maximum value of N;
e) another terminal of the i-th third capacitor is coupled to an intermediate node of an i-th first switch group; and
f) the second capacitor is coupled in parallel with the second switch group.

17. The DC-DC converter of claim 16, wherein the at least one capacitor further comprises at least one isolated capacitor coupled between one terminal of the second switch group and any one of coupling terminals of the N first capacitors.

18. The DC-DC converter of claim 1, wherein:
a) the at least one switch group comprises N first switch groups, one second switch group, and one third switch group, wherein N is a positive integer that is greater than or equal to two;
b) the at least one capacitor comprises N first capacitors, one second capacitor, and N third capacitors;
c) the N first switch groups are sequentially coupled in series between two terminals of a first port;
d) an i-th first capacitor is coupled with an i-th first switch group in parallel, wherein i is a positive integer having a maximum value of N;
e) one terminal of an i-th third capacitor is coupled to an intermediate node of the third switch group;
f) another terminal of the i-th third capacitor is coupled to an intermediate node of an i-th first switch group;
g) the second switch group is coupled in parallel with the third switch group; and
h) the second capacitor is coupled with the second switch group in parallel.

19. The DC-DC converter of claim 18, wherein the at least one capacitor further comprises at least one isolated capacitor coupled between an intermediate node of the second switch group and a coupling terminal of an i-th first capacitor.

20. The DC-DC converter of claim 1, wherein a common node of the first and second switches of the shared switch group is directly connected to a capacitor, and to an inductor of the primary magnetic circuit.

\* \* \* \* \*